(No Model.)

T. S. MOWER.
CUTTER FOR CUTTING GEAR TEETH.

No. 390,982. Patented Oct. 9, 1888.

Witnesses:
L. L. Burket.
Edmund P. Ellis.

Inventor:
T. S. Mower,
per
F. A. Lehmann,
Atty.

UNITED STATES PATENT OFFICE.

THOMAS S. MOWER, OF FITCHBURG, MASSACHUSETTS.

CUTTER FOR CUTTING GEAR-TEETH.

SPECIFICATION forming part of Letters Patent No. 390,982, dated October 9, 1888.

Application filed August 19, 1886. Serial No. 211,296. (No model.)

*To all whom it may concern:*

Be it known that I, THOMAS S. MOWER, of Fitchburg, in the county of Worcester and State of Massachusetts, have invented certain Improvements in Methods and Means for Making Cutters for Cutting Gears; and I hereby declare the following to be a full, clear, and exact description of the same, reference being had to the accompanying drawings, making part of this specification.

My invention relates to an improvement in gear-cutters, but which can be used for milling or for any other purpose; and it consists in a cutter which is formed of two parts provided with cutting teeth, and which are adjustable in relation to each other, one part being provided with pins or projections and the other with suitable openings to receive the projections, and thus hold the two pieces always in their proper relation to each other.

The object of my invention is to provide a cutter in which the parts are adjustable in relation to each other, so as to cut different-sized gears, and in which the teeth may be sharpened without varying the size of the cutter itself.

Figure 1:
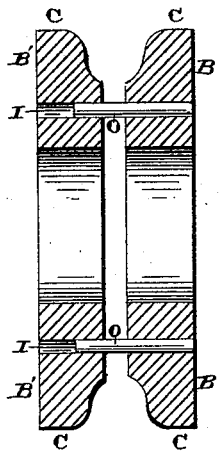
Figure 2:
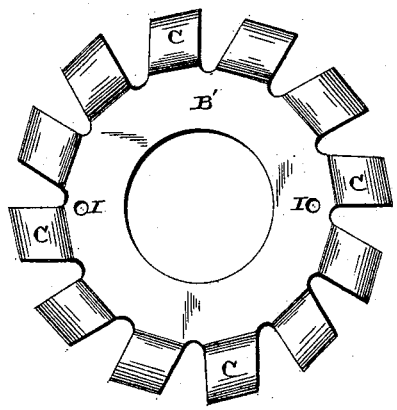
Figure 3:
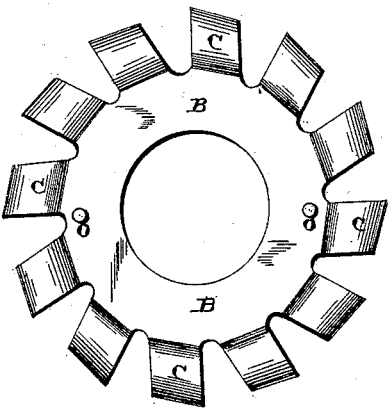

Figure 1 is a vertical section of a portion of one of the cutters, showing how they are applied together. Figs. 2 and 3 are side elevations of the two parts of the cutter alone.

I form my cutter of two separate and distinct parts, B B', each one of which is provided with a series of cutting-teeth, C, upon its edge, and which teeth or cutters are preferably of the shape here shown.

The part B of the cutter is provided with a suitable number of pins, studs, or projections, O, while the part B' is provided with a corresponding number of holes, I, to receive the pins or projections O, and thus hold the parts B B' in any desired relation to each other.

By means of the pins or projections O and the holes I the two parts B B' of the cutter can be adjusted into any desired relation to each other, and thus gears of different sizes can be cut at the will of the operator.

Both of the parts B B' have an opening, D, through the center, so that they can be placed upon a revolving shaft of any kind for the purpose of being operated, and one or both of these parts can be made adjustable upon the shaft, as may be desired.

As the two parts of the cutter are adjustable in relation to each other, the teeth C can be sharpened without changing the size of the cutter itself, for in proportion as the teeth are cut away it is only necessary to adjust the two parts nearer together. The space between the two parts B B' permits of a free clearance of the metal which is cut away.

A cutter constructed as here shown and described is especially adapted for milling the edges of disks for cutting gears and other such purposes, and, owing to the adjustability of the parts, it will cut gears of different thicknesses.

Having thus described my invention, I claim—

A cutter composed of the two toothed parts B B', one of which is provided with studs or projections and the other with corresponding holes to receive the studs, whereby the two parts can be adjusted in relation to each other, substantially as shown and described.

THOMAS S. MOWER.

Witnesses:
THORNTON K. WARE,
BRIGHAM N. BULLOCK.